(12) United States Patent
Deo et al.

(10) Patent No.: US 9,016,334 B2
(45) Date of Patent: Apr. 28, 2015

(54) ASEPTIC CONNECTOR FOR A FREE-FLOWING FOOD

(71) Applicant: PepsiCo. Inc., Purchase, NY (US)

(72) Inventors: Indrani Deo, Ossing, NY (US); Dmitry Falkov, St. Petersburg (RU); Igor Kachko, St. Petersburg (RU); Georgy Martsinovskiy, St. Petersburg (RU); Vladimir Vasiliev, St. Petersburg (RU); Mikhail Verbitsky, Stoughton, MA (US)

(73) Assignee: PepsiCo, Inc., Purchase, NY (US)

( * ) Notice: Subject to any disclaimer, the term of this patent is extended or adjusted under 35 U.S.C. 154(b) by 333 days.

(21) Appl. No.: 13/664,588

(22) Filed: Oct. 31, 2012

(65) Prior Publication Data

US 2013/0105015 A1    May 2, 2013

Related U.S. Application Data (60) Provisional application No. 61/554,288, filed on Nov. 1, 2011.

(51) Int. Cl.
*B65B 1/04* (2006.01)
*F17D 1/00* (2006.01)
*F16L 29/00* (2006.01)

(52) U.S. Cl.
CPC ........... *F17D 1/00* (2013.01); *F16L 29/002* (2013.01); *F16L 29/007* (2013.01); *F16L 2201/44* (2013.01)

(58) Field of Classification Search
CPC ... F16L 2201/44; F16L 29/002; F16L 29/007; F17D 1/00

USPC .......... 141/301, 302, 329; 251/149.2, 315.01; 137/247.21, 247.23, 614.2
See application file for complete search history.

(56) References Cited

U.S. PATENT DOCUMENTS

| | | | | |
|---|---|---|---|---|
| 3,076,893 | A | * 2/1963 | Damoth et al. | 250/288 |
| 4,322,291 | A | 3/1982 | Ho | |
| 4,335,747 | A | * 6/1982 | Mitsumoto et al. | 137/614.06 |

(Continued)

FOREIGN PATENT DOCUMENTS

WO    99/38562 A1    8/1999

OTHER PUBLICATIONS

International Search Report & Written Opinion from related PCT Application No. PCT/US2012062798, mailed Jan. 18, 2013.

*Primary Examiner* — Timothy L Maust
(74) *Attorney, Agent, or Firm* — Banner & Witcoff, Ltd.

(57) ABSTRACT

A reusable aseptic connector is provided. The connector may be used to provide fluid communication between a bag-in-box (BIB) container and a beverage dispenser. The connector may provide aseptic properties of the connection by insulation of an inner volume of a first part and an inner volume of a second part, with the beverage component kept from contacting any of the part of the connector structure that are exposed to the environment and have a risk of induced contamination. The connector may comprise a resilient membrane and a sliding tube wherein the sliding tube is configured to have a portion move toward and through the resilient membrane to establish fluid communication between the first part and the second part, and for the portion to move away from the resilient membrane to destablish fluid communication between the first part and the second part when desired.

29 Claims, 5 Drawing Sheets

CONNECTION POSITION 2. (OPERATIVE POSITION)

(56) References Cited

U.S. PATENT DOCUMENTS

| | | | |
|---|---|---|---|
| 4,577,659 A * | 3/1986 | Gembus et al. | 137/614.06 |
| 4,757,921 A | 7/1988 | Snowball | |
| 4,867,052 A | 9/1989 | Cipelletti | |
| 4,969,991 A | 11/1990 | Valadez | |
| 5,064,097 A | 11/1991 | Brog et al. | |
| 5,316,673 A | 5/1994 | Kohlmann et al. | |
| 5,339,874 A | 8/1994 | Cragun | |
| 5,450,882 A | 9/1995 | Cragun | |
| 5,484,538 A | 1/1996 | Woodward | |
| 5,492,147 A | 2/1996 | Challender et al. | |
| 5,762,491 A * | 6/1998 | Williams et al. | 432/156 |
| 6,077,427 A | 6/2000 | Burrows | |
| 6,216,918 B1 | 4/2001 | Saveliev et al. | |
| 6,354,341 B1 | 3/2002 | Saveliev et al. | |
| 6,382,467 B2 | 5/2002 | Saveliev et al. | |
| 6,394,992 B1 | 5/2002 | Sjoholm | |
| 6,449,970 B1 | 9/2002 | Gagliano | |
| 6,483,119 B1 | 11/2002 | Baus | |
| 6,695,168 B2 | 2/2004 | Pinedjian et al. | |
| 8,696,811 B2 * | 4/2014 | Javidi et al. | 117/33 |
| 2001/0010318 A1 | 8/2001 | Saveliev et al. | |
| 2005/0247614 A1 | 11/2005 | Wiemer et al. | |
| 2006/0048849 A1 | 3/2006 | Decler | |
| 2006/0175352 A1 | 8/2006 | Emmendorfer et al. | |
| 2007/0137726 A1 | 6/2007 | Yan | |
| 2008/0048436 A1 | 2/2008 | Matkovich et al. | |
| 2008/0142037 A1 | 6/2008 | Dempski et al. | |
| 2010/0101929 A1 | 4/2010 | Kamen et al. | |
| 2010/0176147 A1 | 7/2010 | Segers | |
| 2010/0247374 A1 | 9/2010 | Pellet | |
| 2011/0042944 A1 | 2/2011 | Johns et al. | |

\* cited by examiner

INITIAL POSITION.
FIG. 1

CONNECTION POSITION 1.
FIG. 2A

CONNECTION POSITION 2. (OPERATIVE POSITION)

FIG. 3

FIG. 5 CONNECTION POSITION 1.

FIG. 4 INITIAL POSITION.

CONNECTION POSITION 3.

FIG. 6

ASEPTIC CONNECTOR FOR A FREE-FLOWING FOOD

CROSS REFERENCE TO RELATED APPLICATIONS

This application is a non-provisional of and claims priority to pending provisional U.S. Application No. 61/554,288, filed Nov. 1, 2011, and entitled "Aseptic Connector for a Free-Flowing Food," the entire disclosure of which is hereby incorporated by reference in its entirety and for all purposes.

FIELD OF THE INVENTION

This disclosure relates generally to an aseptic connector for dispensers, e.g., beverage dispensers for cafeterias, restaurants (including fast food restaurants), theatres, convenience stores, gas stations, and other entertainment and/or food service venues, with reduced exposure to the environment and associated contamination.

BACKGROUND

Aseptic connectors have been developed in an attempt to prevent or reduce contamination of fluids, such as beverage components, and other free-flowing foods.

An existing aseptic connection device has a first part having an injection needle and a protecting sleeve, which has an orifice that can be punctured and which at least partially surrounds the needle. A second part includes a rubber-like element, which can penetrated be by the needle and can be resealed when the needle is withdrawn. This existing connection device has drawbacks when applied to a beverage dispenser. One drawback is that a cross section of the needle may not provide the required flow rate. Another drawback is that multiple use of the conventional device can lead to weakening of the sealing properties of the rubber-like element after multiple punctures. Another drawback is that the needle may sever a portion of punctured element, and the severed portion of the element may alter a fluid flow path and contaminate the system or otherwise interfere with the flow of fluid through the connector.

An existing method of making a sterile connection comprises coupling a first fitting having an aperture and a second fitting having an aperture, removing first and second strip out layers from between the end surfaces of sealed first and second resilient sealing members, and contacting the end surfaces of the resilient sealing members to provide fluid communication between the aperture of the first fitting and the aperture of the second fitting. At least one drawback of this method is that the connector is not reusable.

Therefore, there is a need for improved aseptic connectors for dispensers, particularly for food dispensers, including beverage dispensers, which do not have the drawbacks of conventional connectors.

SUMMARY

In one aspect of the disclosure, a reusable aseptic connector is provided. The connector comprises a first part and a second part. The first part defines an inner volume, the inner volume including a first end and a second end. The first part comprises a ball valve. The ball valve has an initial position that seals the first end of the inner volume. The ball valve defines a channel. The first part comprises a first bayonet mounting member. The second part comprises a resilient member and a sliding tube. The sliding tube defines an inner volume, the sliding tube including a first end and second end. The first end of the sliding tube defines a first opening and the second end of the sliding tube defines a second opening. The resilient member provides an aseptic seal of the first opening of the sliding tube when the sliding tube is in an initial position. The second part comprises a second bayonet mounting member. The first bayonet mounting member of the first part forms an aseptic seal with the second bayonet mounting member when joined together. The ball valve is configured to be rotated from its initial position so that the channel defined by the ball valve is positioned coaxially with the sliding tube of the second part. The sliding tube is configured to move from its initial position to an operative position when the sliding tube is moved in a direction toward the first part so that the first end of the sliding tube penetrates the resilient member and then enters the channel defined by the ball valve.

The above and other aspects, features and advantages of the present disclosure will be apparent from the following detailed description of the illustrated embodiments thereof which are to be read in connection with the accompanying drawings.

DETAILED DESCRIPTION

There is a need for a reusable, robust connector for aseptic replacement of discharged bag-in-box ("BIB") containers for beverage dispensers.

In one aspect of the disclosure, a connector is provided for a free-flowing material. The free-flowing material may be a free-flowing food, including a beverage, a beverage component, and/or a dairy product. The connector may be positioned between a storage container and a dispenser for the free-flowing material.

In one aspect of the disclosure, an embodiment is provided that comprises a reusable aseptic connector that provides fluid communication between a BIB container and a beverage dispenser. The connector may provide aseptic properties of the connection by insulation of an inner volume of the dispensing machine and an inner volume of an attached container, with the beverage component kept from contacting any of the parts of the connector structure that are exposed to the environment and have a risk of induced contamination. The aseptic connector may include a dispenser part and a container part. The container part may include a resilient membrane. The resilient membrane may also be protected by a removable cover.

Figure 1:
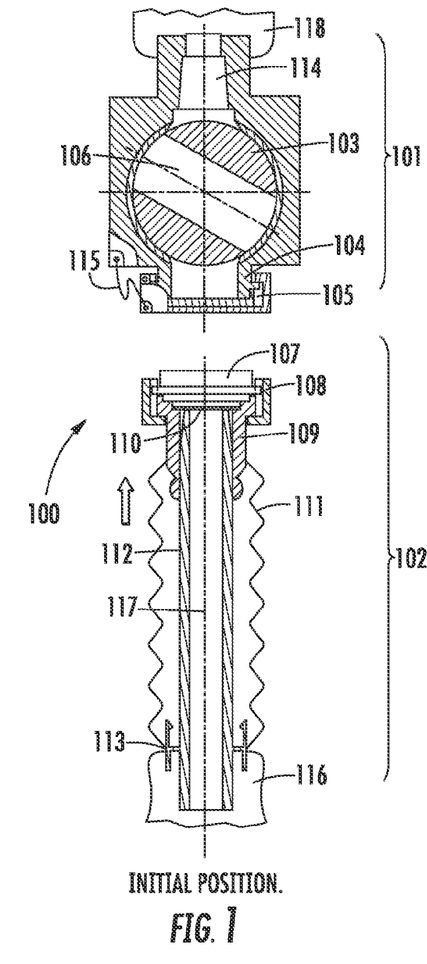
FIG. 1 shows a connector in accordance with aspects of the disclosure, the connector in an initial position wherein a dispenser part and a container part of the connector are not connected.

FIG. 1 illustrates an embodiment in accordance with aspects of the disclosure. More specifically, FIG. 1 illustrates a connector 100 in an initial position, that is, in an initial detached and closed state. Connector 100 comprises a dispenser part 101 and a container part 102. Dispenser part 101 may be part of and/or attached to an inlet 118 of a beverage dispenser. Container part 102 may be a part of and/or attached to a bag-in-box (BIB) container 116.

Figure 2A:
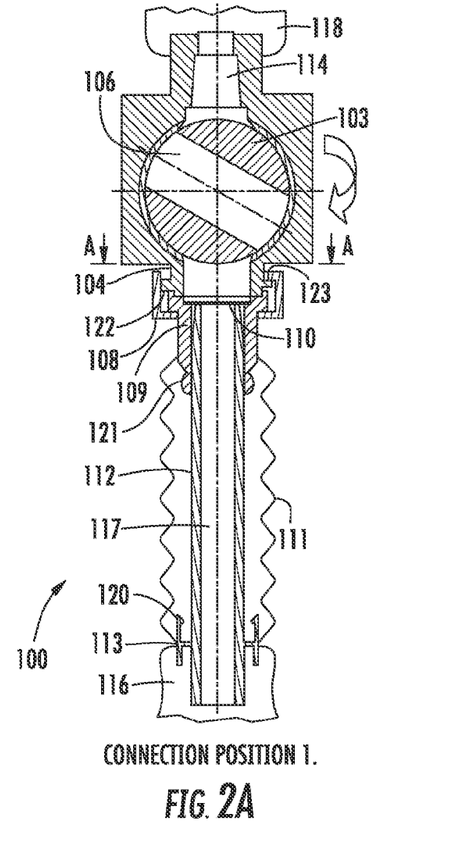
FIG. 2A shows a connector in accordance with aspects of the disclosure, the connector in a connected position.

As shown in FIG. 1, in an initial detached and closed state, an inner volume 114 of dispenser part 101 may be sealed by a ball valve 103 and may be additionally protected by a removable cover 105. Removable cover 105 may be removed. For example, removable cover 105 may be removed from a protecting position relative to inner volume 114 by pivoting a portion of removable cover 105 about a pivot or hinge 115 and away from the protecting position. As shown in FIG. 2A, removable cover 105 has been removed from dispenser part 101.

As shown in FIG. 1, in an initial detached and closed state, an inner volume 117 of container part 102 may be sealed by resilient member 110, and may be additionally protected by removable cover 107. Container part 102 may provide aseptic protection for BIB container 116 by a resilient membrane 110, which can be implemented, for example, as a metal coated polymer film. The resilient member 110 may also be protected by a removable cover 107. Removable cover 107 may be removed. For example, removable cover 107 may be removed from a protecting position relative to inner volume 117 by pivoting a portion of removable cover 107 about a pivot or hinge (not shown, but which may have a similar structure to pivot or hinge 115), and away from the protecting position. As shown in FIG. 2A, removable cover 107 has been removed from container part 102.

Attachment of container part 101 to dispenser part 102 may include the following steps that are in accordance with an aspect of the disclosure. First, cover 105 may be moved out of its protecting position relative to inner volume 114, and cover 107 may be moved out of its protecting position relative to inner volume 117. Dispenser part 101 and container part 102 may be brought into contact and fixed to each other by a mounting. The mounting may be any suitable mounting. For example, the mounting may be a bayonet mount, the mounting comprising a first member 104 and a second member 108. First member 104 may be a component of dispenser part 101 and second member 108 may be a component of container part 102. Alternatively, first member 104 may be a component of container part 102 and second member 108 may be a component of dispenser part 101. As shown in FIG. 2A, a portion(s) or lip(s) 122 of first member 104 and a portion(s) or lip(s) 123 of second member 108 may provide a frictional or interlocking fit.

A first connection position of connector 100 is shown in FIG. 2A. In this first connection position of connector 100, the inner volume 114 of the dispenser part 101 is still sealed with the ball valve 103, and the inner volume 117 of the container part 102 is still sealed with the resilient membrane 110.

Figure 2B:
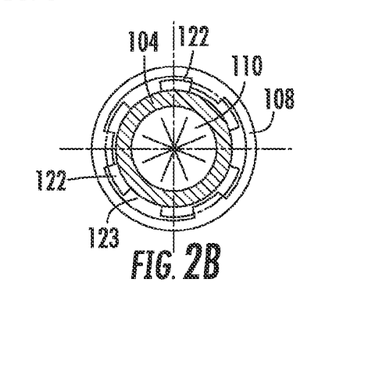
FIG. 2B is a cut-away view taken along line A-A in FIG. 2A in accordance with at least one aspect of the disclosure.

FIG. 2B shows a cut-away view taken along line A-A in FIG. 2A in accordance with an aspect of the disclosure.

Figure 2C:
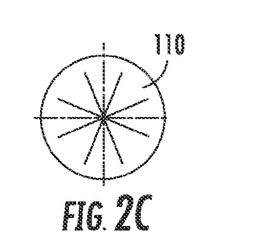
FIG. 2C is a top view of a resilient member 110 shown in FIG. 2A and FIG. 2B in accordance with at least one aspect of the disclosure.

FIG. 2C illustrates a top view of a resilient member 110 shown in FIG. 2A and FIG. 2B in accordance with an aspect of the disclosure.

Figure 3:
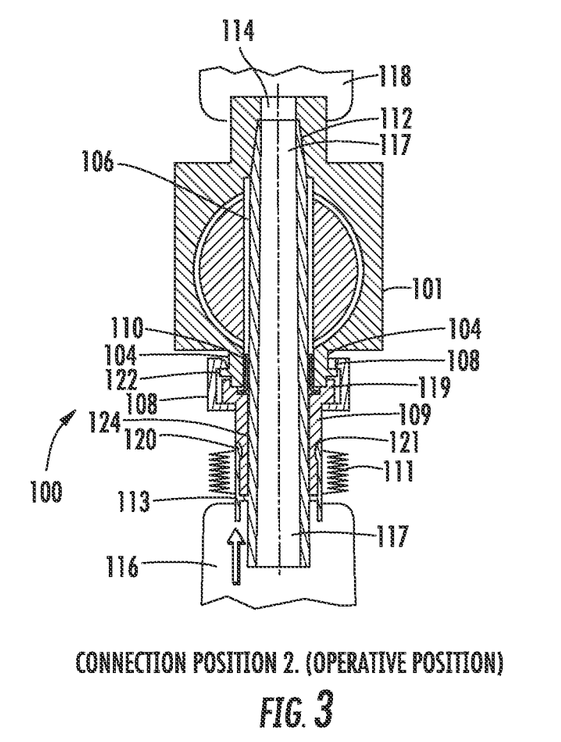
FIG. 3 shows a connector in accordance with at least one aspect of the disclosure, the connector in an operative position wherein a dispenser part and a container part of the connector are in fluid communication with each other.

As shown in FIG. 3, an additional protective sealing may be formed at the interface 119 between first member 104 and bushing 109. Furthermore, in FIG. 3, ball valve 103 may be rotated from its position shown in FIG. 2A so that channel 106 defined by ball valve 103 may be positioned coaxially with a sliding tube 112 of container part 102. The sliding tube 112 may be moved in a direction toward the dispenser part 101 so that sliding tube 112 may penetrate the channel 106. The position of the sliding tube 112 may be fixed by securing component 113 when a male member 120 of securing component 113 mates with a female member 121 of bushing 109. At this position, the inner volume 114 of the dispenser part 101 and the inner volume 117 of the container part 102 may be sealed by the mount interface 119 between first member 104 and bushing 109 and also by a corrugation 111, which insulates the interface 124 between bushing 109 and the sliding tube 112. Thus, a second connection position, also called an operative position, of connector 100 is shown in FIG. 3. In the second connection position of connector 100, a beverage component may be transferred from the container part 102 into the dispenser part 101 without leaking out connector 100.

When the container 116 is emptied, disconnection may include the following steps that are in accordance with an aspect of the disclosure. The sliding tube 112 may be retracted from the container part 101, and the ball valve 103 may be rotated to its initial position until the entrance into the inner volume 114 of the dispenser part 101 is closed, as shown in FIG. 2A. Then, the first member 104 and second member 108 may be detached and protective covers 105 and 107 may be installed, as shown in FIG. 1. External surfaces the connector may be subjected to decontamination treatment prior to reusing connector to connect a container to a dispenser.

As shown in FIG. 1, FIG. 2A, and FIG. 3, the dispenser part may comprise ball valve 103, and the container part may comprise the sliding tube 112. Those of ordinary skill in the art will recognize that in accordance with the present disclosure, the container part may comprise the ball valve and the dispenser part may comprise the sliding tube 112.

Figure 4:
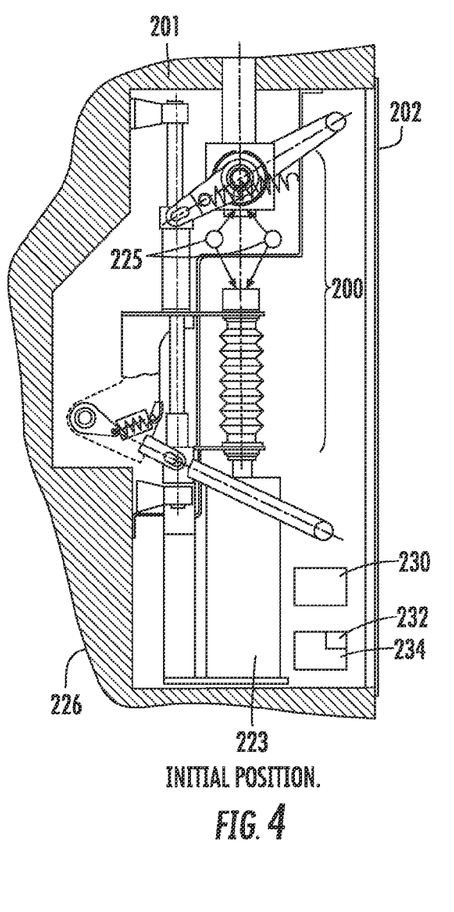
FIG. 4 shows an embodiment in accordance with aspects of the disclosure.
Figure 5:
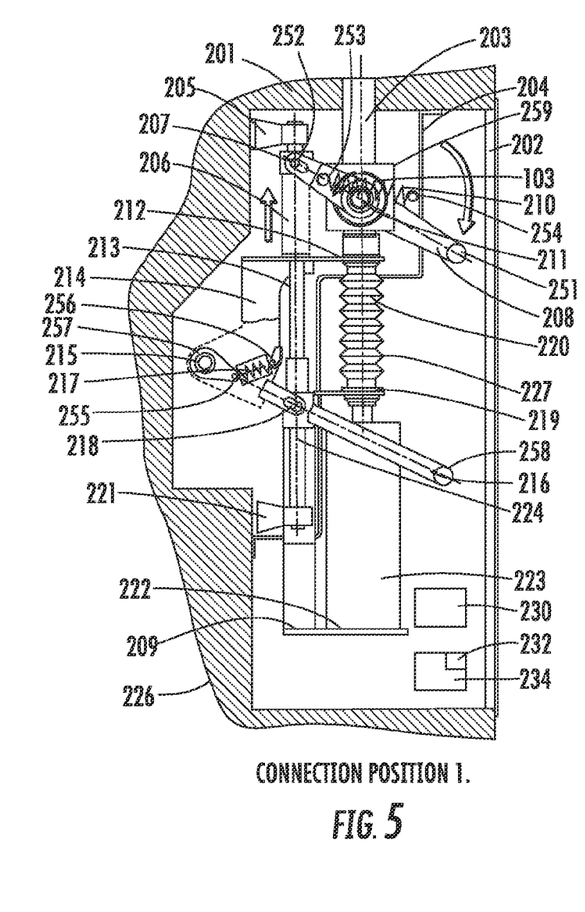
FIG. 5 shows an embodiment in accordance with aspects of the disclosure.

FIG. 4 and FIG. 5 show a compartment 226 that houses a container 223 with connector 200 in accordance with an aspect of the disclosure. Connector 200 may have the same or equivalent structure as connector 100 shown in FIG. 1, FIG. 2A, and FIG. 3. Connector 200 may also be connected to a dispenser tube 203. A compartment or housing 226 may comprise mechanisms providing the possibility of connecting and disconnecting the container 223 via successive switching of control levers or handles 208 and 216. The compartment 226 may comprise decontamination apparatus 225, e.g., one or more UV lamps 225, that may be configured to decontaminate the surfaces of the connector 200 prior to the connecting of dispenser part 259 to container part 220 to reduce risk of bacteria penetration into the dispenser tube 203. Dispenser tube 203 may be connected to or be a part of a beverage dispenser. Dispenser part 259 may be the same as or similar to dispenser part 101 shown in FIG. 1, FIG. 2A, and FIG. 3. Container part 220 may be the same as or similar to the container part 102 shown in FIG. 1, FIG. 2A, and FIG. 3.

The following sequence of steps may be performed for replacement of an emptied container 223 in accordance with an aspect of the disclosure. A compartment or housing 226 may comprise a wall 201 and a cover 202. Cover 202 may close an opening defined by wall 201 of compartment 226. Staring with an initial position shown in FIG. 4, cover 202 of the compartment 226 may be opened. Levers 216 and 208 may be successively switched to the positions shown in FIG. 4. Next, the emptied container 223 may be removed from brackets 212 and 219. A new container 223, filled with a beverage component, can be installed so that a new, filled container 223 can be retained by brackets 212 and 219. A decontamination device(s) 225, e.g., one or more UV lamps, can be turned on for a period sufficient to provide necessary decontamination of external surfaces of a container part 220 and the dispenser part 259 prior to the external surfaces of these parts coming into contact with each other and/or assembled to provide fluid communication between these parts. For example, ultraviolet radiation exposure for decontaminating external surfaces of the container part 220 and the dispenser part 259 may be provided by decontamination device(s) 225, e.g. one or more UV lamps.

Decontamination device(s) 225 may be turned on and off automatically, e.g., by a controller 230, as desired. Controller 230 may be configured to turn decontamination device(s) 225 on or off automatically in accordance with predetermined periods. A computer readable medium 232 may be configured to provide instructions to controller 230 to turn decontamination device(s) 225 on or off as desired. Controller 230 may comprise computer readable medium 232. Alternatively, a computer 234 may comprise computer readable medium 232, and provide instructions to controller 230 to turn decontamination device(s) 225 on or off as desired.

Upon completion of decontamination of external surfaces, the levers 208 and 216 may be successively switched. When lever 208 is operated or switched from the initial position shown in FIG. 4 to the first connection position shown in FIG. 5, ball valve 103 may be opened and concurrently with this opening of ball valve 103, the container part 220 of connector 200 may move upward and connect with dispenser part 259 of the connector 200.

When lever 216 is operated or switched, the container part 220 of the connector 200 may move into the operative position. Thus, the operative position of connector 200 may be the same or equivalent operative position of connector 100 shown in FIG. 3. Cover 202 of the compartment 226 may then be used to close the opening defined by the wall 201 of compartment 226.

The inner space of the compartment 226 may be configured as follows in accordance with an aspect of the disclosure. The container part 220 may be fixed in brackets 212 and 219. Bracket 212 may be connected with plate 214. Plate 214 may be attached to bush sleeve 206, which may move by guide of shaft 213 attached to the wall 201 by brackets 205 and 221. Lever 216 may be secured to plate 214 on shaft 215, which makes it possible for lever 216 to rotate in relation to the plate 214 and impart its translational displacement along the guide of shaft 213. Spring 217 may be attached at a first end 255 to lever 216 near the point where the lever 216 is attached to the plate 214. A second end 256 of spring 217 may be attached to plate 214. Spring 217 may fix the terminal position of switching of lever 216. When being switched from one position to another, lever 216 may move the dispenser part 259 of the connector 200 into the operative position shown in FIG. 5, which may be the same operative position shown in FIG. 3. Bracket 219, fixing the lower section of container part 220 of connector 200, and bracket 222, supporting the container 223, may be connected with bush sleeve 224 that is moved by guide of shaft 213 after lever 216 is switched.

A first end 251 of lever 208 may be secured to bush sleeve 206 by means of shaft 207, which makes it possible for the lever 208 to rotate relative to the bush sleeve 206 and impart to it translational motion along the guide of shaft 213. Lever 208 may be secured to ball valve 103 of the dispenser part by means of a shaft 211, which in turn, provides turning (opening and closing) of ball valve 103 in the case of lever switching. Lever 208 may have a second end 252 opposite the first end 251. Lever 208 may be configured to switch the ball valve 103 from its closed position to its open position when the first end 251 of the first lever 208 is rotated towards the container part 102. First lever 208 may be connected to a first shaft 211, and first shaft 211 may be connected to the ball valve 103 and configured to impart a rotational movement of the ball valve 103. The second end 252 of the first lever 208 may be connected to a first sleeve 206 by a second shaft 207, the first lever 208 rotatable relative to the first sleeve 206 and configured to impart to the first sleeve 206 a translational motion along a guide of a third shaft 213.

A first end 253 of spring 210 may be attached to lever 208 in proximity to where lever 208 is secured to bush sleeve 206. A second end 254 of spring 210 may be attached to an enclosure placement member 204. Spring 210 may fix the terminal position of switching of lever 208.

The container part 220 may be positioned between a first bracket 212 and a second bracket 219. Container part may comprise a corrugation 227. Corrugation 227 may be the same as or similar to the corrugation 111 shown in FIG. 1, FIG. 2A, and FIG. 3. As shown in FIG. 4 and FIG. 5, the first bracket 212 may be connected with a plate 214, and the plate 214 may be connected to the sleeve 206. The plate 214 may be movable by the guide of the shaft 213. The shaft 213 may be attached to the compartment 226 by a top bracket 205 and a bottom bracket 221.

A second lever 216 may be provided, the second lever 216 including a first end 257 and a second end 258. The first end 257 of the second lever 216 may be secured to the plate 214 by a shaft 215. The second lever 216 may be attached to a second sleeve 224 by a shaft 218. The second lever 216 may be rotatable in relation to the plate 214 and configured to impart to the second sleeve 224 a translational motion along a guide of shaft 213.

Figure 6:
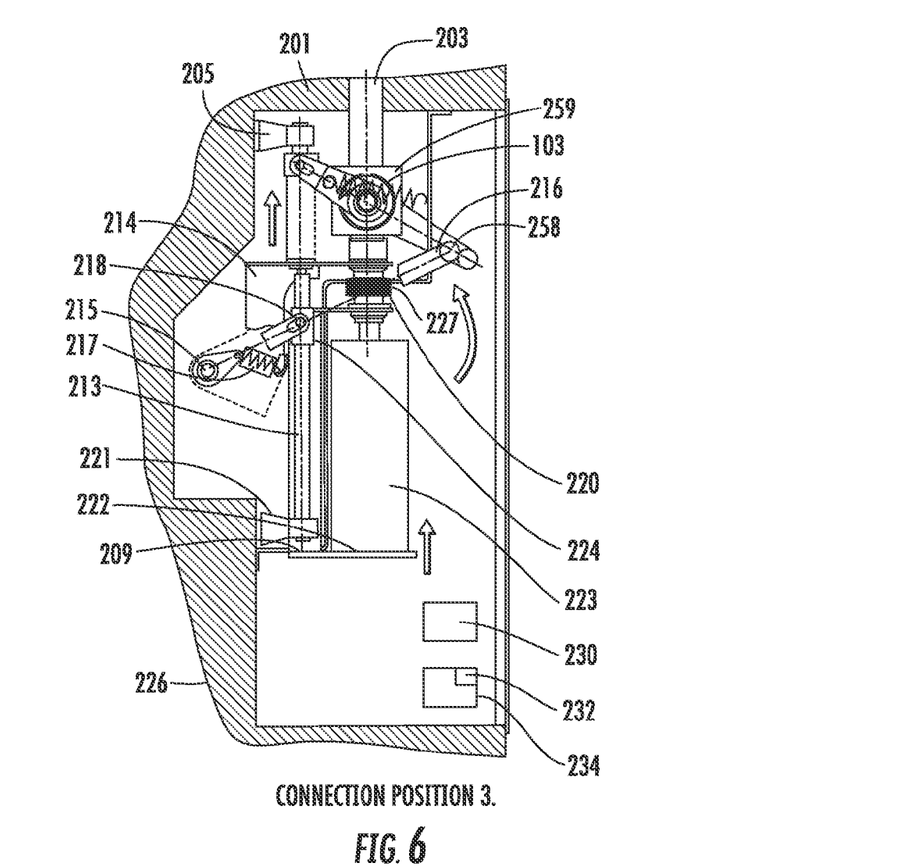
FIG. 6 shows an embodiment in accordance with aspects of the disclosure.

As shown in FIG. 6, when the second end 258 of the second lever 216 is rotated towards the dispenser part 259, the sliding tube of the container part 220 (e.g., sliding tube 112 shown in FIG. 1) may move from its initial position to its operative position (e.g., the same as or similar to the movement of the sliding tube 112 from an initial position shown in FIG. 1 and FIG. 2A, to an operative position as shown in FIG. 3). As shown in FIG. 6, when the sliding tube of the container part 220 is moved to its operative position, bracket 219 moves towards bracket 212, and corrugation 227 goes from an expanded position to a compressed position.

The apparatus may further comprise a second spring 217, the second spring having a first end 255 and a second end 256. The first end 255 of the second spring 217 may be attached to the second lever 216. The second end 256 of the second spring 217 may be connected to the plate 214. The second spring may fix a terminal position of switching of the second lever 216.

As shown in FIG. 4, FIG. 5 and FIG. 6, the dispenser part 259 may comprise ball valve 103, and the container part 220 may comprise a sliding tube (not shown, but may be e.g., a sliding tube 112 shown in FIG. 1, FIG. 2A, and FIG. 3). Those of ordinary skill in the art will recognize that in accordance with the present disclosure, the container part 220 may comprise the ball valve 103 and the dispenser part 259 may comprise a sliding tube (e.g., a sliding tube 112 shown in FIG. 1, FIG. 2A, and FIG. 3).

Figure 7A:
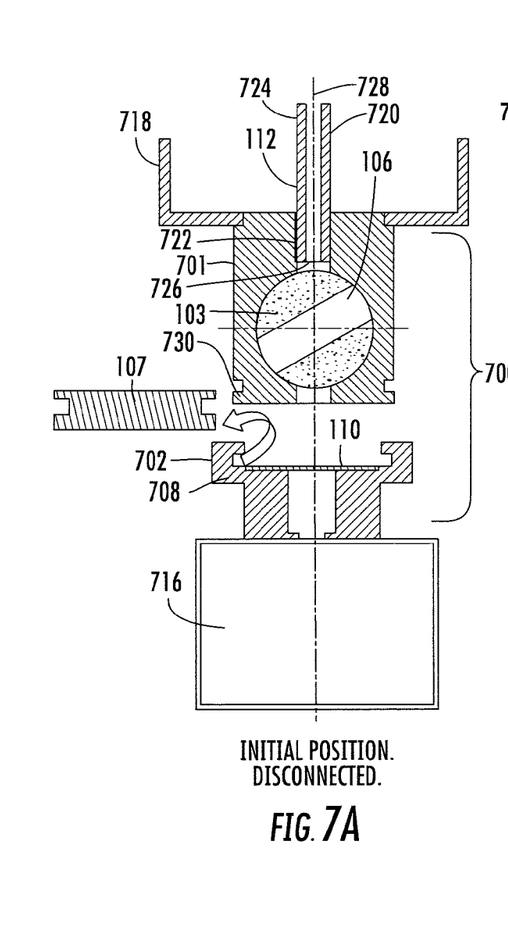
FIGS. 7A, 7B and 7C show an embodiment in accordance with aspects of the disclosure.
Figure 7B:
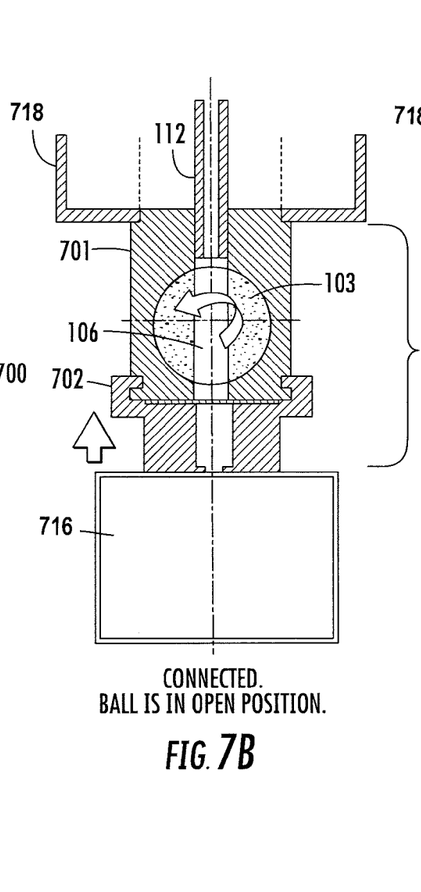
Figure 7C:
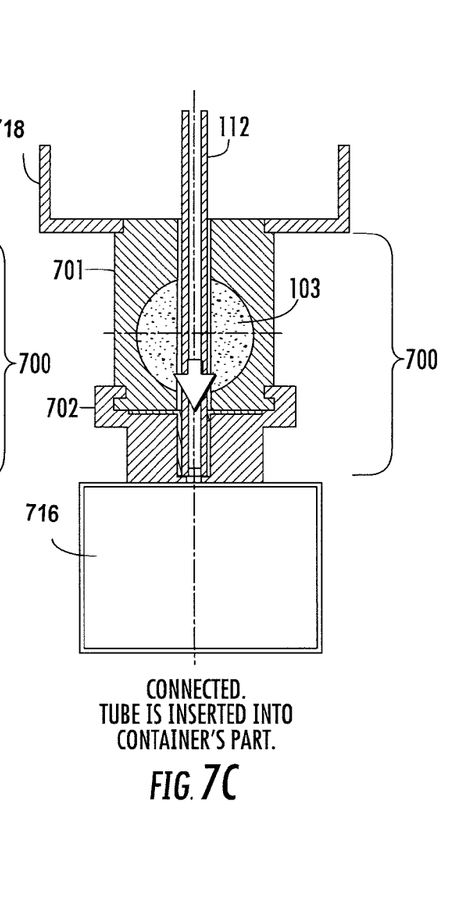

Those skilled in the art will recognize that in accordance with this disclosure, the design described above represents just one of multiple options to arrange an aseptic connector. Other arrangements using the same or similar means to obtain aseptic properties by controlled alignment of ball valve 103 and sliding tube 112 can be employed. For example, the arrangement of the connector components is possible when the ball valve 103 and the sliding tube 112 are both located at the dispenser side of the connector 700, as shown in FIG. 7A, FIG. 7B, and FIG. 7C. Another arrangement, not shown, can have an arrangement of connector components wherein the ball valve 103 and the sliding tube 112 are both located on the container side of the connector 700.

As shown in FIG. 7A, connector 700 comprises a first assembly 701 and a second assembly 702. A portion of first assembly 701 is connected to an inlet 118 of a dispenser or dispensing machine. FIG. 7A shows connector 700 in an initial, disconnected position, wherein the first assembly 701 is not connected to a second assembly 702. FIG. 7A shows removal of cover 107 from second assembly 702. In FIG. 7A, ball valve 103 is shown in a closed position.

FIG. 7B shows connector 700 connecting an inlet 118 of a dispenser to a container 116 in a connected position, wherein ball valve 103 is in an open position, i.e., the ball valve 103 has been rotated so that channel 106 defined by ball valve 103 is positioned coaxially with the sliding tube 112.

FIG. 7C shows connector 700 in a connected position, wherein a section of the sliding tube 112 has been slid through the ball valve 103 and inserted into the second assembly 702 of connector 700.

Thus, as shown in FIG. 7A, FIG. 7B, and FIG. 7C, a reusable aseptic connector 700 between a beverage storage container 716 and an inlet 718 of a beverage dispenser is provided. Connector 700 comprises a first assembly 701. The first assembly 701 comprises a ball valve 103 and a sliding tube 112. The ball valve 103 defines a channel 106. The sliding tube 112 defines an inner volume 720. The sliding tube 112 has a first end 722 and second end 724, the first end 722 of the sliding tube 112 defining a first opening 726, the second end 724 of the sliding tube 112 defining a second opening 728. The ball valve 103 provides an aseptic seal of the first opening 726 of the sliding tube 112 when the ball valve 103 is in an initial position. The first assembly 701 further comprises a first bayonet mounting member 730. First bayonet mounting member 730 may be the same as or similar to the first bayonet mounting member 104 shown in FIG. 1.

Connector 700 further comprises a second assembly 702. The second assembly 702 comprises a resilient member 110 and a second bayonet mounting member 708. Mounting member 708 may be the same as or similar to the second bayonet mounting member 108 shown in FIG. 1.

The first bayonet mounting member 730 of the first assembly 701 may form an aseptic seal with the second bayonet mounting member 730 of the second assembly 702 when joined together.

The ball valve 103 may be configured to be rotated from its initial position so that the channel 106 defined by the ball valve is positioned coaxially with the sliding tube 112. The sliding tube 112 may be configured to move from an initial position to an operative position when the sliding tube 112 is moved in a direction toward the second assembly 702 so that the first end 722 of the sliding tube 112 enters the channel 106 defined by the ball valve 103 and penetrates the resilient member 110.

External surfaces the connector 700 may be subjected to decontamination treatment prior to reusing connector 700 to connect a container to a dispenser.

An aspect of the disclosure includes a reusable aseptic connector comprising: a first part, and a second part. The first part may define an inner volume, the inner volume having a first end and a second end. The first part may comprise a ball valve, the ball valve having an initial position that seals the first end of the inner volume, the ball valve defining a channel.

The first part may comprise a first bayonet mounting member. The second part may comprise a resilient member and a sliding tube. The sliding tube may define an inner volume, and may have a first end and second end. The first end of the sliding tube may define a first opening. The second end of the sliding tube may define a second opening. The resilient member may provide an aseptic seal of the first opening of the sliding tube when the sliding tube is in an initial position, the second part comprising a second bayonet mounting member. The first bayonet mounting member of the first part may form an aseptic seal with the second bayonet mounting member when joined together. The ball valve may be configured to be rotated from its initial position so that the channel defined by the ball valve is positioned coaxially with the sliding tube of the second part. The sliding tube may be configured to move from the initial position to an operative position when the sliding tube is moved in a direction toward the first part so that the first end of the sliding tube penetrates the resilient member and then enters the channel defined by the ball valve.

In a further aspect of the disclosure, the first part of the reusable aseptic connector may be a dispenser part that may be configured to be connected to an inlet of a beverage dispenser at the second end of the inner volume. In a further aspect of the disclosure, the second part of the reusable aseptic connector may be a container part that may be configured to be connected to an outlet of a beverage container at the second end of the sliding tube.

In a further aspect of the disclosure, the first part may be a container part that may be configured to be connected to an outlet of a beverage container at the second end of the sliding tube, and the second part may be a dispenser part that may be configured to be connected to an inlet of a beverage dispenser at the second end of the inner volume.

In a further aspect of the disclosure the first bayonet mount may comprise a least one lip and the second bayonet mount comprises at least one lip, the at least one lip of the first bayonet mount and the at least one lip of the second bayonet mount forming an interlocking aseptic seal.

In a further aspect of the disclosure, the resilient member may have a circular cross-section.

In a further aspect of the disclosure, the resilient member may comprise a plurality of semi-perforated cuts configured to facilitate penetrating of the sliding tube through the resilient member, the plurality of semi-perforated cuts meeting at the center of the circular cross-section.

In a further aspect of the disclosure, the resilient member may comprise a plurality of semi-perforated cuts configured to facilitate penetrating of the sliding tube through the resilient member.

In a further aspect of the disclosure, the second part further may comprise a bushing. The bushing may provide a support for the resilient member, the bushing comprising a first mating member.

In a further aspect of the disclosure, the second part further may comprise a second mating member. The second mating member may be located at the second end of the sliding tube. The second mating member and the first mating member may form an interlocking fit when joined together after the sliding tube penetrates the resilient member and the channel defined by the ball valve.

In a further aspect of the disclosure, the reusable aseptic connector may comprise a corrugation. The corrugation may extend between the first mating member and the second mating member, the corrugation insulating an interface between the bushing and the sliding tube.

In a further aspect of the disclosure, the sliding tube may be configured to return to its initial position by retracting the first end of the sliding tube from the channel of the ball valve, back through the resilient member, and back into the second part. The resilient member may provide an aseptic seal at the first opening defined by the first end of the sliding tube.

In another aspect of the disclosure, an apparatus comprises a housing, and a reusable aseptic connector, the connector housed in the housing. The reusable aseptic connector may comprise a first part. The first part may define an inner volume. The inner volume may have a first end and a second end. The first part may comprise a ball valve, the ball valve defining a channel. The ball valve may have a closed position when the ball valve seals the first end of the inner volume. The reusable aseptic connector may comprise a second part, the second part comprising a resilient member and a sliding tube. The sliding tube may define an inner volume. The sliding tube may have a first end and second end, the first end of the sliding tube defining a first opening, and the second end of the sliding tube defining a second opening. The resilient member may provide an aseptic seal of the first opening of the sliding tube when the sliding tube is in an initial position. The ball valve may be configured to be rotated from its closed position to an open position, the open position of the ball valve being when the channel defined by the ball valve is positioned coaxially with the sliding tube of the second part. The sliding tube may be configured to move from an initial position to an operative position when the sliding tube is moved in a direction toward the first part so that the first end of the sliding tube penetrates the resilient member and the enters the channel defined by the ball valve. The reusable aseptic connector may comprise a first lever. The first lever may have a first end and a second end. The first lever may be configured to switch the ball valve from its closed position to its open position when the first end of the first lever is rotated towards the container part.

In a further aspect of the disclosure, the first part may be a dispenser part configured to be connected to an inlet of a beverage dispenser at the second end of the inner volume. The second part may be a container part configured to be connected to an outlet of a beverage container at the second end of the sliding tube.

In a further aspect of the disclosure, the first part may be a container part that may be configured to be connected to an outlet of a beverage container at the second end of the sliding tube. The second part may be a dispenser part that may be configured to be connected to an inlet of a beverage dispenser at the second end of the inner volume.

In a further aspect of the disclosure, the first lever may be connected to a first shaft. The first shaft may be connected to the ball valve and configured to impart a rotational movement of the ball valve.

In a further aspect of the disclosure, the second end of the first lever may be connected to a first sleeve by a second shaft. The first lever may be rotatable relative to the first sleeve and configured to impart to the first sleeve a translational motion along a guide of a third shaft.

In a further aspect of the disclosure, the apparatus may comprise a first spring, the first spring having a first end and a second end, the first end of the first spring attached to the first lever in proximity to where the first lever is connected to the first sleeve. The second end of the first spring may be attached to an enclosure placement member. The first spring may fix a terminal position of switching of the first lever.

In a further aspect of the disclosure, the second part may be positioned between a first bracket and a second bracket. The first bracket may be connected with a plate. The plate may be connected to a second sleeve. The plate may be movable by the guide of the third shaft. The third shaft may be attached to the housing by a third bracket and a fourth bracket.

In a further aspect of the disclosure, the apparatus may comprise a second lever. The second lever may have a first end and a second end. The first end of the second lever may be secured to the plate by a fourth shaft. The second lever may be attached to a second sleeve by a fifth shaft. The second lever may be rotatable in relation to the plate and configured to impart to the second sleeve a translational motion along a guide of a third shaft, wherein when the second end of the second lever is rotated towards the first part the sliding tube is moved from its initial position to its operative position.

In a further aspect of the disclosure, the apparatus may comprise a second spring. The second spring may have a first end and a second end. The first end of the second spring may be attached to the second lever. The second end of the second spring may be connected to the plate. The second spring may fix a terminal position of switching of the second lever.

In a further aspect of the disclosure, the apparatus may comprise at least one decontamination device configured to deliver decontamination treatment to an external surface of the first part and an external surface of the second part prior to connecting the first part and the second part.

In a further aspect of the disclosure, the at least one decontamination device may be configured to deliver decontamination treatment to the external surface of the first part and the external surface of the second part automatically.

In a further aspect of the disclosure, the at least one decontamination device may be an ultraviolet lamp, and the decontamination treatment is ultraviolet radiation.

In another aspect of the disclosure, a reusable aseptic connector may be provided and positioned between a beverage storage container and a beverage dispenser. The connector may comprise a first assembly. The first assembly may comprise a ball valve and a sliding tube. The ball valve may define a channel. The sliding tube may define an inner volume, the sliding tube having a first end and second end. The first end of the sliding tube may define a first opening, the second end of the sliding tube defining a second opening. The ball valve may provide an aseptic seal of the first opening of the sliding tube when the ball valve is in an initial position. The first assembly may further comprise a first bayonet mounting member. The connector may comprise a second assembly. The second assembly may comprise a resilient member and a second bayonet mounting member. The first bayonet mounting member of the first assembly may form an aseptic seal with the second bayonet mounting member of the second assembly when joined together. The ball valve may be configured to be rotated from its initial position so that the channel defined by the ball valve is positioned coaxially with the sliding tube. The sliding tube may be configured to move from an initial position to an operative position when the sliding tube is moved in a direction toward the second assembly so that the first end of the sliding tube enters the channel defined by the ball valve and penetrates the resilient member.

In a further aspect of the disclosure, the first assembly may be a dispenser assembly configured to be connected to an inlet of a beverage dispenser. The second assembly may be a container assembly configured to be connected to an outlet of a beverage container.

In a further aspect of the disclosure, the first assembly may be a container assembly configured to be connected to an outlet of a beverage container. The second assembly may be a dispenser assembly configured to be connected to an inlet of a beverage dispenser.

In a further aspect of the disclosure, the connector may comprise at least one decontamination device configured to deliver decontamination treatment to an external surface of the first assembly and an external surface of the second assembly prior to connecting the first assembly and the second assembly.

In a further aspect of the disclosure, the at least one decontamination device may be configured to deliver decontamination treatment to the external surface of the first assembly and the external surface of the second assembly automatically.

In a further aspect of the disclosure, the at least one decontamination device may be an ultraviolet lamp, and the decontamination treatment may be ultraviolet radiation.

As will be recognized by those skilled in the art, the above described embodiments may be configured to be compatible with fountain system requirements, and can accommodate a wide variety of fountain offerings, including but not limited beverages known under any PepsiCo branded name, such as Pepsi-Cola®, and custom beverage offerings. The embodiments described herein offer speed of service at least and fast or faster than conventional systems. The embodiments described herein may be configured to be monitored, including monitored remotely, with respect to operation and supply levels. The embodiments described herein are economically viable and can be constructed with off-the-shelf components, which may be modified in accordance with the disclosures herein.

Those of skill in the art will recognize that in accordance with the disclosure any of the features and/or options in one embodiment or example can be combined with any of the features and/or options of another embodiment or example.

The disclosure herein has been described and illustrated with reference to the embodiments of the figures, but it should be understood that the features of the disclosure are susceptible to modification, alteration, changes or substitution without departing significantly from the spirit of the disclosure. For example, the dimensions, number, size and shape of the various components may be altered to fit specific applications. Accordingly, the specific embodiments illustrated and described herein are for illustrative purposes only and the disclosure is not limited except by the following claims and their equivalents.

We claim:

1. A reusable aseptic connector comprising:
   a first part, and
   a second part,
   the first part defining an inner volume, the inner volume having a first end and a second end, the first part comprising a ball valve, the ball valve having an initial position that seals the first end of the inner volume, the ball valve defining a channel, the first part comprising a first bayonet mounting member, and
   the second part comprising a resilient member and a sliding tube, the sliding tube defining an inner volume, the sliding tube having a first end and second end, the first end of the sliding tube defining a first opening, the second end of the sliding tube defining a second opening, the resilient member providing an aseptic seal of the first opening of the sliding tube when the sliding tube is in an initial position, the second part comprising a second bayonet mounting member,
   the first bayonet mounting member of the first part forming an aseptic seal with the second bayonet mounting member when joined together,
   the ball valve configured to be rotated from its initial position so that the channel defined by the ball valve is positioned coaxially with the sliding tube of the second part,
   the sliding tube configured to move from the initial position to an operative position when the sliding tube is moved in a direction toward the first part so that the first end of the sliding tube penetrates the resilient member and then enters the channel defined by the ball valve.

2. The reusable aseptic connector of claim 1, wherein the first part is a dispenser part configured to be connected to an inlet of a beverage dispenser at the second end of the inner volume, and the second part is a container part configured to be connected to an outlet of a beverage container at the second end of the sliding tube.

3. The reusable aseptic connector of claim 1, wherein first part is a container part configured to be connected to an outlet of a beverage container at the second end of the sliding tube, and the second part is a dispenser part configured to be connected to an inlet of a beverage dispenser at the second end of the inner volume.

4. The reusable aseptic connector of claim 1, wherein the first bayonet mount comprises a least one lip and the second bayonet mount comprises at least one lip, the at least one lip of the first bayonet mount and the at least one lip of the second bayonet mount forming an interlocking aseptic seal.

5. The reusable aseptic connector of claim 1, wherein the resilient member has a circular cross-section.

6. The reusable aseptic connector of claim 5, wherein the resilient member comprises a plurality of semi-perforated cuts configured to facilitate penetrating of the sliding tube through the resilient member, the plurality of semi-perforated cuts meeting at the center of the circular cross-section.

7. The reusable aseptic connector of claim 1, wherein the resilient member comprises a plurality of semi-perforated cuts configured to facilitate penetrating of the sliding tube through the resilient member.

8. The reusable aseptic connector of claim 1, wherein the second part further comprises a bushing, the bushing providing a support for the resilient member, the bushing comprising a first mating member.

9. The reusable aseptic connector of claim 8, wherein the second part further comprises a second mating member, the second mating member located at the second end of the sliding tube, the second mating member and the first mating member forming an interlocking fit when joined together after the sliding tube penetrates the resilient member and the channel defined by the ball valve.

10. The reusable aseptic connector of claim 9, further comprising a corrugation, the corrugation extending between the first mating member and the second mating member, the corrugation insulating an interface between the bushing and the sliding tube.

11. The reusable aseptic connector of claim 1, wherein the sliding tube is configured to return to its initial position by retracting the first end of the sliding tube from the channel of the ball valve, back through the resilient member, and back into the second part, the resilient member providing an aseptic seal at the first opening defined by the first end of the sliding tube.

12. An apparatus comprising:
    a housing, and
    a reusable aseptic connector, the connector housed in the housing, the connector comprising:
    a first part, the first part defining an inner volume, the inner volume having a first end and a second end, the first part comprising a ball valve, the ball valve defining a channel, the ball valve having a closed position when the ball valve seals the first end of the inner volume, and
    a second part, the second part comprising a resilient member and a sliding tube, the sliding tube defining an inner volume, the sliding tube having a first end and second end, the first end of the sliding tube defining a first opening, the second end of the sliding tube defining a second opening, the resilient member providing an aseptic seal of the first opening of the sliding tube when the sliding tube is in an initial position, the ball valve configured to be rotated from its closed position to an open position, the open position of the ball valve being when the channel defined by the ball valve is positioned coaxially with the sliding tube of the second part, the sliding tube configured to move from an initial position to an operative position when the sliding tube is moved in a direction toward the first part so that the first end of the sliding tube penetrates the resilient member and the enters the channel defined by the ball valve, a first lever having a first end and a second end, the first lever configured to switch the ball valve from its closed position to its open position when the first end of the first lever is rotated towards the container part.

13. The apparatus of claim 12, wherein the first part is a dispenser part configured to be connected to an inlet of a beverage dispenser at the second end of the inner volume, and the second part is a container part configured to be connected to an outlet of a beverage container at the second end of the sliding tube.

14. The apparatus of claim 12, wherein first part is a container part configured to be connected to an outlet of a beverage container at the second end of the sliding tube, and the second part is a dispenser part configured to be connected to an inlet of a beverage dispenser at the second end of the inner volume.

15. The apparatus of claim 12, wherein the first lever is connected to a first shaft, the first shaft connected to the ball valve and configured to impart a rotational movement of the ball valve.

16. The apparatus of claim 12, wherein the second end of the first lever is connected to a first sleeve by a second shaft, the first lever rotatable relative to the first sleeve and configured to impart to the first sleeve a translational motion along a guide of a third shaft.

17. The apparatus of claim 16, further comprising a first spring, the first spring having a first end and a second end, the first end of the first spring attached to the first lever in proximity to where the first lever is connected to the first sleeve, the second end of the first spring attached to an enclosure placement member, the first spring fixing a terminal position of switching of the first lever.

18. The apparatus of claim 16, wherein the second part is positioned between a first bracket and a second bracket, the first bracket connected with a plate, the plate connected to a second sleeve, the plate movable by the guide of the third shaft, the third shaft attached to the housing by a third bracket and a fourth bracket.

19. The apparatus of claim 18, further comprising a second lever, the second lever having a first end and a second end, the first end of the second lever secured to the plate by a fourth shaft, the second lever attached to a second sleeve by a fifth shaft, the second lever rotatable in relation to the plate and configured to impart to the second sleeve a translational motion along a guide of a third shaft, wherein when the second end of the second lever is rotated towards the first part the sliding tube is moved from its initial position to its operative position.

20. The apparatus of claim 19, further comprising a second spring, the second spring having a first end and a second end, the first end of the second spring attached to the second lever, the second end of the second spring connected to the plate, the second spring fixing a terminal position of switching of the second lever.

21. The apparatus of claim 12, further comprising at least one decontamination device configured to deliver decontamination treatment to an external surface of the first part and an external surface of the second part prior to connecting the first part and the second part.

22. The apparatus of claim 21, wherein the at least one decontamination device is configured to deliver decontamination treatment to the external surface of the first part and the external surface of the second part automatically.

23. The apparatus of claim 21, wherein the at least one decontamination device is an ultraviolet lamp, and the decontamination treatment is ultraviolet radiation.

24. A reusable aseptic connector between a beverage storage container and a beverage dispenser, the connector comprising:

an first assembly, the first assembly comprising a ball valve and a sliding tube, the ball valve defining a channel, the sliding tube defining an inner volume, the sliding tube having a first end and second end, the first end of the sliding tube defining a first opening, the second end of the sliding tube defining a second opening, the ball valve providing an aseptic seal of the first opening of the sliding tube when the ball valve is in an initial position, the first assembly further comprising a first bayonet mounting member, and a second assembly, the second assembly comprising a resilient member and a second bayonet mounting member, the first bayonet mounting member of the first assembly forming an aseptic seal with the second bayonet mounting member of the second assembly when joined together, the ball valve configured to be rotated from its initial position so that the channel defined by the ball valve is positioned coaxially with the sliding tube, the sliding tube configured to move from an initial position to an operative position when the sliding tube is moved in a direction toward the second assembly so that the first end of the sliding tube enters the channel defined by the ball valve and penetrates the resilient member.

25. The reusable aseptic connector of claim 24, wherein the first assembly is a dispenser assembly configured to be connected to an inlet of a beverage dispenser, and the second assembly is a container assembly configured to be connected to an outlet of a beverage container.

26. The reusable aseptic connector of claim 24, wherein first assembly is a container assembly configured to be connected to an outlet of a beverage container, and the second assembly is a dispenser assembly configured to be connected to an inlet of a beverage dispenser.

27. The apparatus of claim 24, further comprising at least one decontamination device configured to deliver decontamination treatment to an external surface of the first assembly and an external surface of the second assembly prior to connecting the first assembly and the second assembly.

28. The apparatus of claim 27, wherein the at least one decontamination device is configured to deliver decontamination treatment to the external surface of the first assembly and the external surface of the second assembly automatically.

29. The apparatus of claim 27, wherein the at least one decontamination device is an ultraviolet lamp, and the decontamination treatment is ultraviolet radiation.

* * * * *